United States Patent [19]

Orlando et al.

[11] 4,418,521

[45] Dec. 6, 1983

[54] HARVESTER WITH SELECTIVE FORCE BALANCED SHAKING MECHANISM

[75] Inventors: Franklin P. Orlando, Morgan Hill; Donald G. Mortensen, San Jose, both of Calif.

[73] Assignee: FMC Corporation, Chicago, IL

[21] Appl. No.: 329,786

[22] Filed: Dec. 11, 1981

[51] Int. Cl.³ ............................................. A01D 46/00
[52] U.S. Cl. .................................. 56/330; 56/328 TS
[58] Field of Search ........................... 56/330, 328 TS

[56] References Cited

U.S. PATENT DOCUMENTS

| 1,035,056 | 8/1912 | Shubert et al. | 56/29 |
|---|---|---|---|
| 3,167,899 | 2/1965 | Best | 56/29 |
| 3,184,908 | 5/1965 | Rust | 56/330 |
| 3,187,493 | 6/1965 | Harrett | 56/330 |
| 3,229,453 | 1/1966 | Harrett | 56/330 |
| 3,396,521 | 8/1968 | McKibben et al. | 56/330 |
| 3,439,478 | 4/1969 | Orton | 56/1 |
| 3,485,027 | 12/1969 | Ganger | 56/330 |
| 3,688,482 | 11/1971 | Horn | 56/330 |
| 3,774,381 | 11/1973 | Burton | 56/330 |
| 3,911,653 | 10/1975 | Burton | 56/330 |
| 4,014,160 | 3/1977 | Mecca | 56/330 |
| 4,016,711 | 4/1977 | Claxton | 56/330 |
| 4,051,649 | 10/1977 | Clary | 56/330 |
| 4,063,406 | 12/1977 | Burton | 56/330 |
| 4,085,572 | 4/1978 | Bruel | 56/330 |
| 4,114,463 | 9/1978 | Garden et al. | 56/330 |
| 4,172,352 | 10/1979 | McCarthy et al. | 56/328 |
| 4,173,859 | 11/1979 | Goldsmith et al. | 56/330 |
| 4,198,801 | 4/1980 | Claxton | 56/1 |
| 4,207,727 | 6/1980 | Poytress | 56/330 |
| 4,208,861 | 6/1980 | Tennes et al. | 56/328 TS |
| 4,250,700 | 2/1981 | Horn et al. | 56/330 |
| 4,265,080 | 5/1981 | Goldsmith | 56/330 |
| 4,286,426 | 9/1981 | Orlando et al. | 56/330 |
| 4,336,682 | 6/1982 | Orlando | 56/328 TS |

OTHER PUBLICATIONS

Upright Update, vol. 5, No. 2, 1980, Upright Harvesters entitled New Grape Picking System for the 1980's.

Primary Examiner—Paul J. Hirsch
Attorney, Agent, or Firm—A. J. Moore; H. M. Stanley; R. B. Megley

[57] ABSTRACT

A multi-purpose harvester for plants such as grapes or the like is disclosed and utilizes front and rear force balanced shaker units for minimizing the weight and expense of the harvester. Depending upon the type and varieties of crops being harvested, the harvester may be easily modified to operate as a foliage shaker alone with the front and rear shakers being driven either by a single motor or by separate motors; or the harvester may be easily modified to operate as a combination foliage and trunk shaker which is powered by a single motor or by front and rear motors selectively driven at speeds found to be most effective to dislodge the crop from the plants.

10 Claims, 10 Drawing Figures

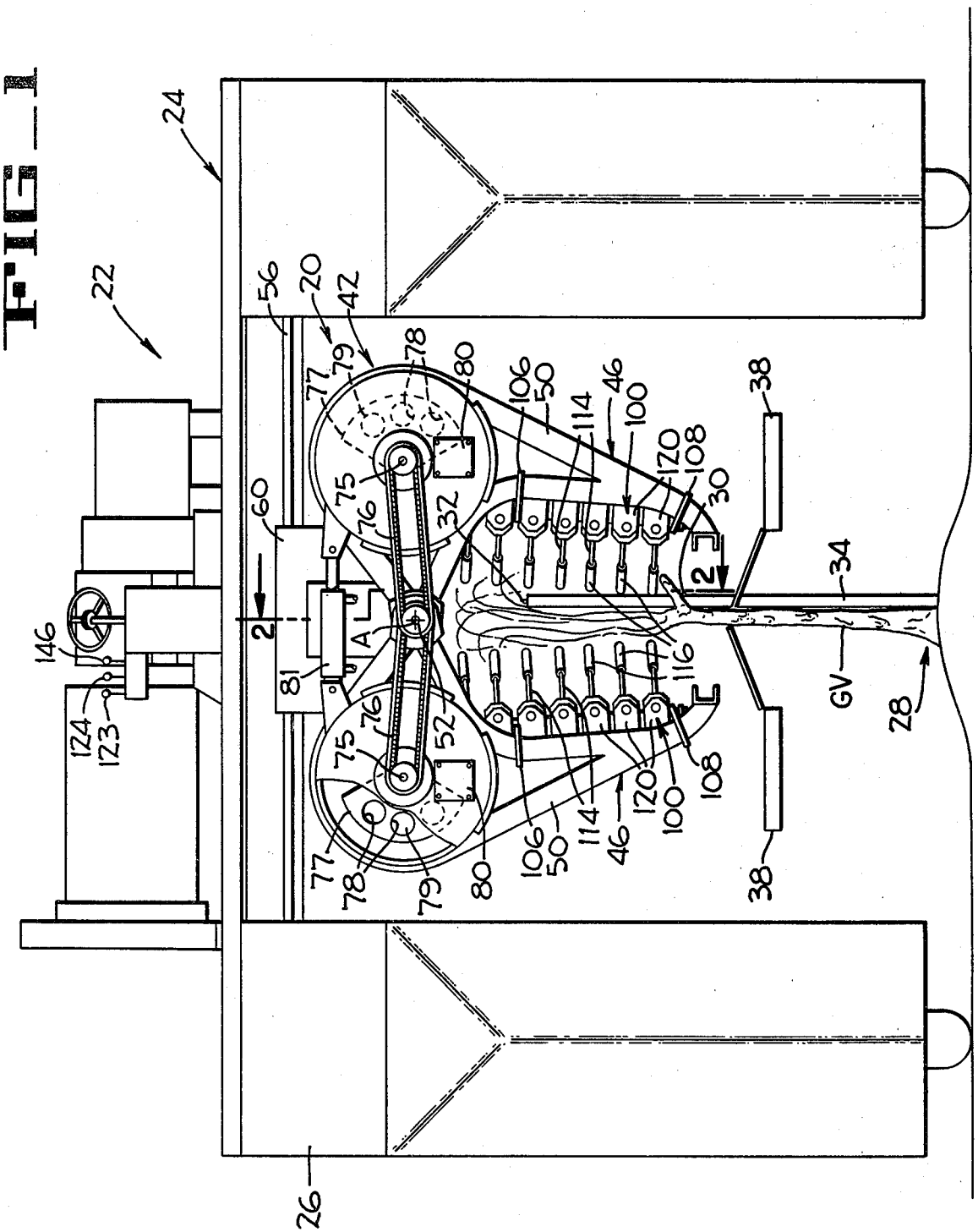

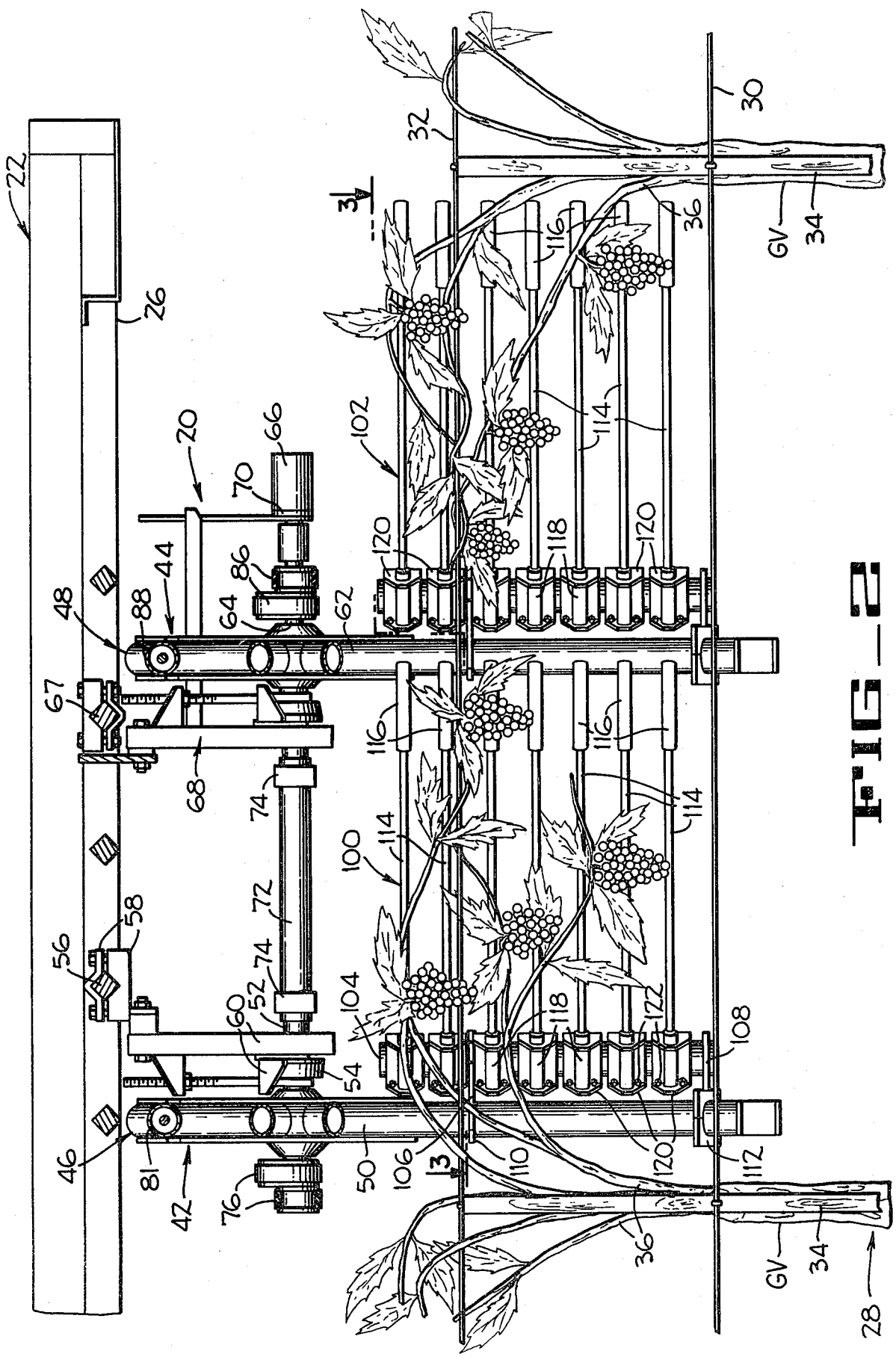

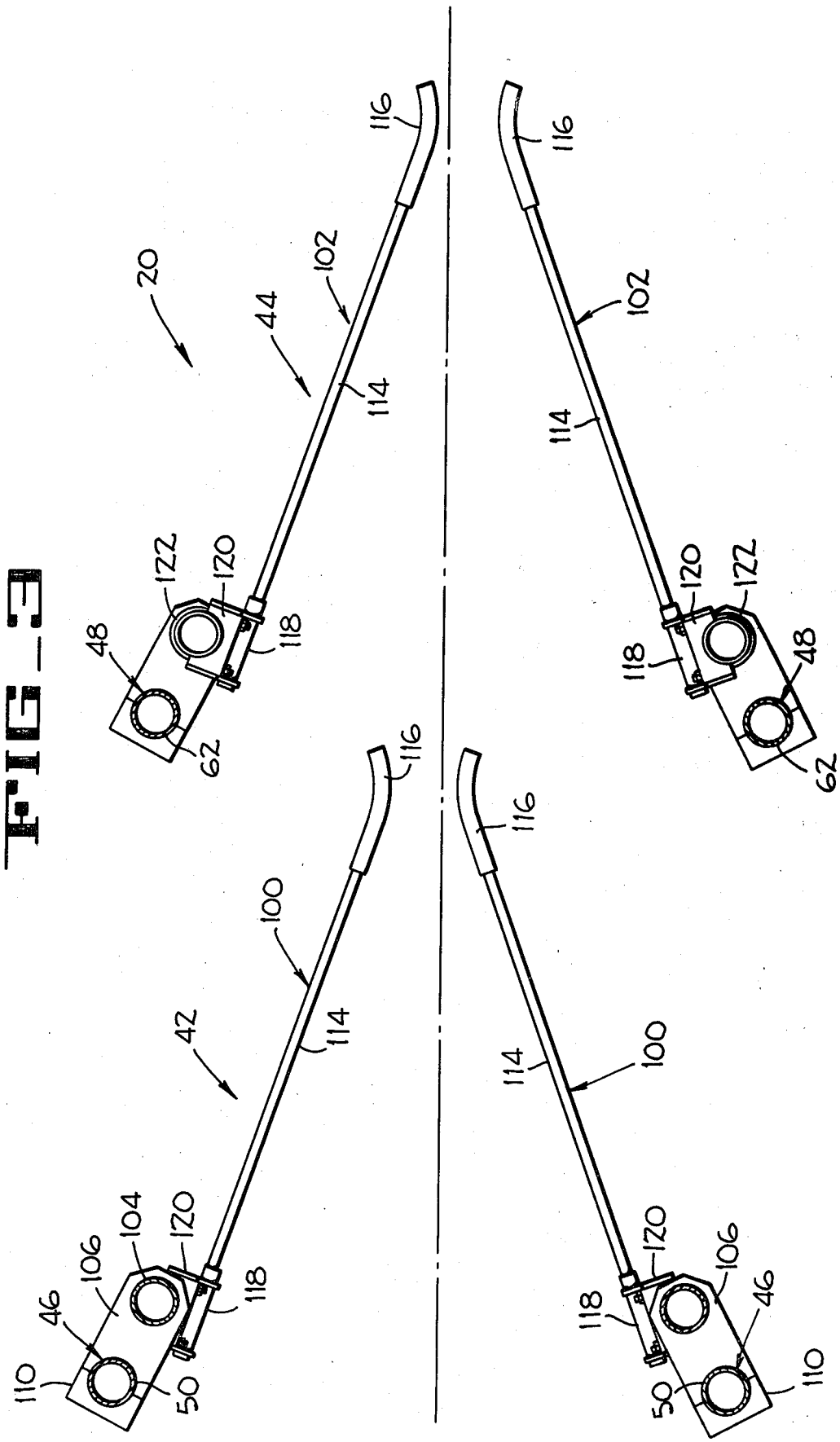

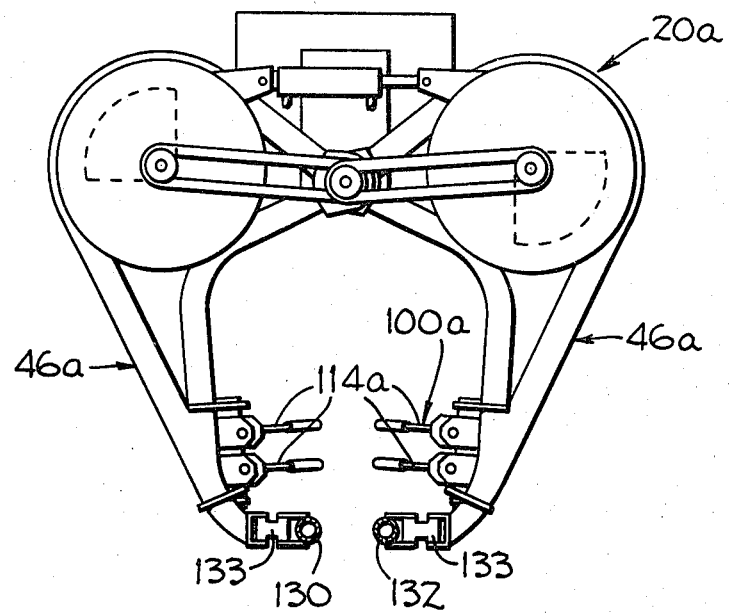
FIG_4
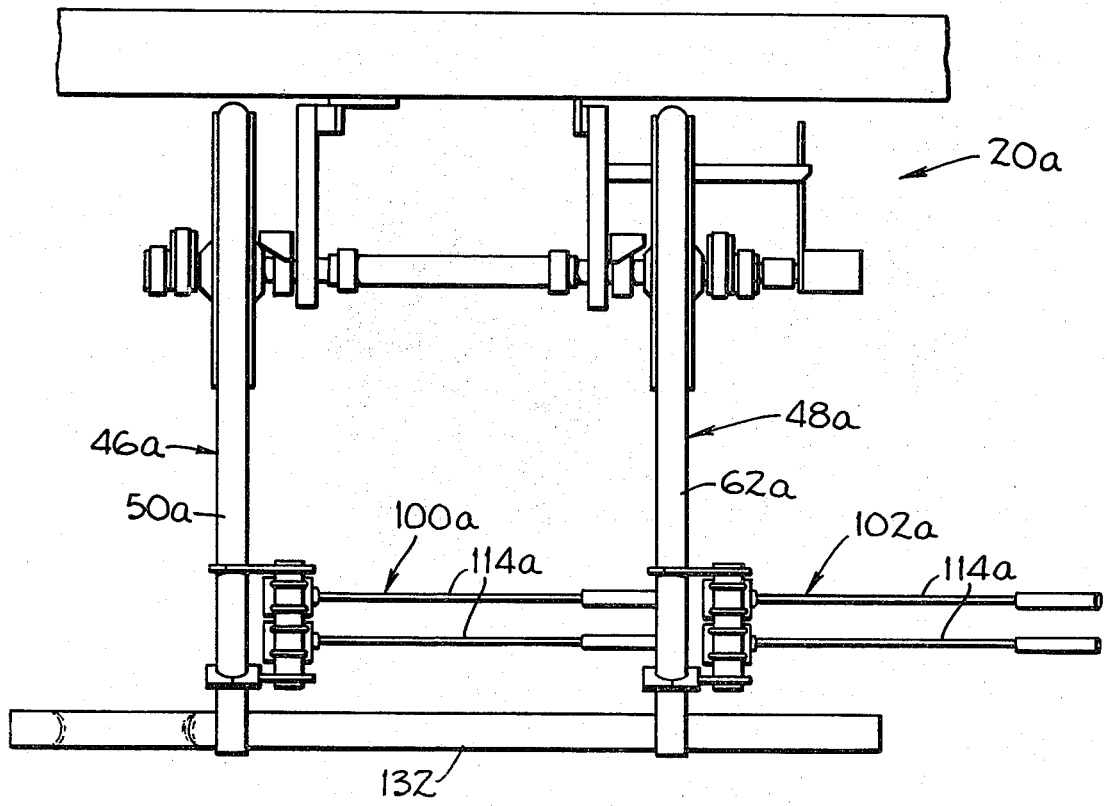
FIG_5

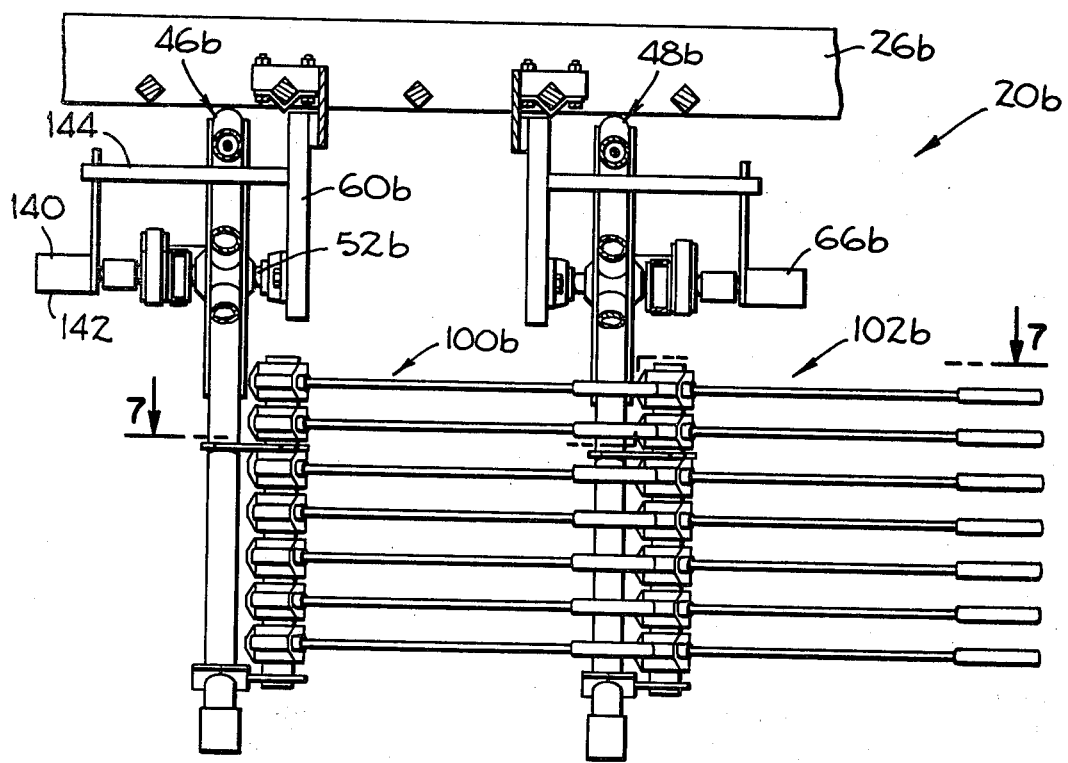
FIG_6
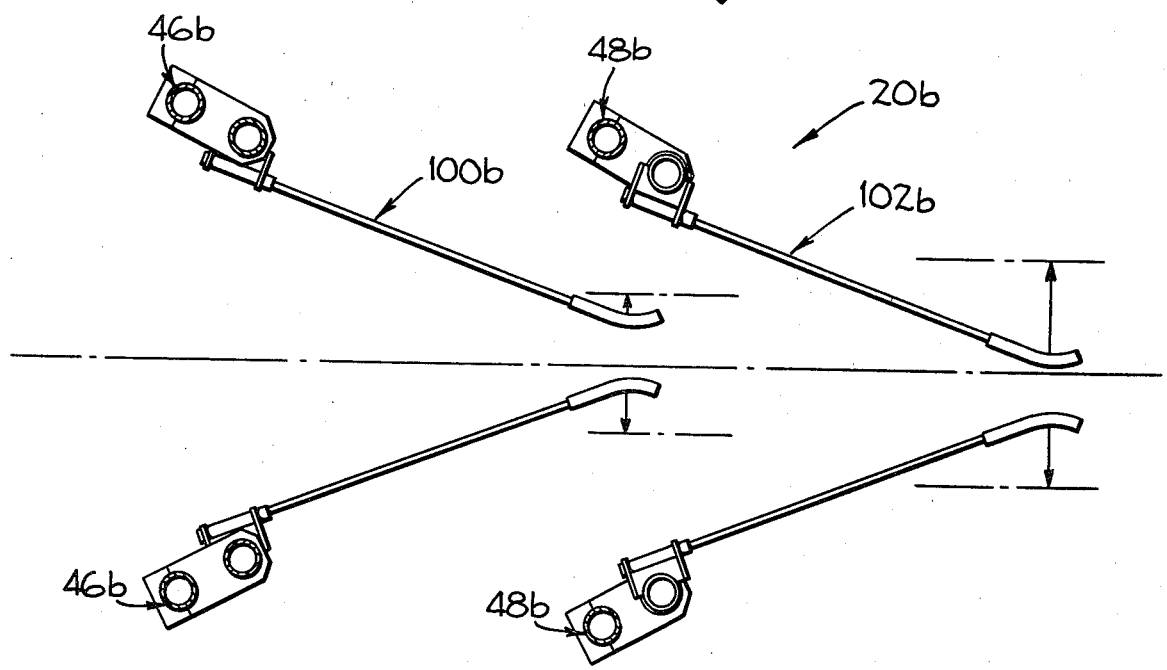
FIG_7

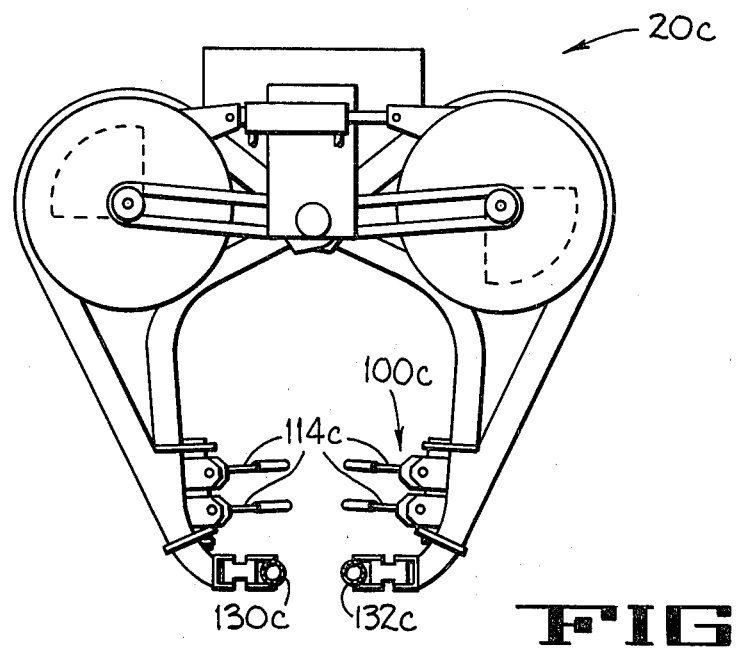
FIG_8
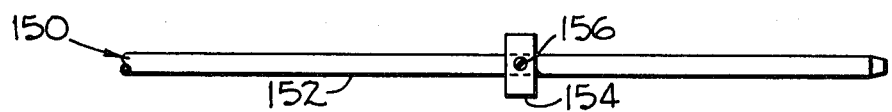
FIG_10
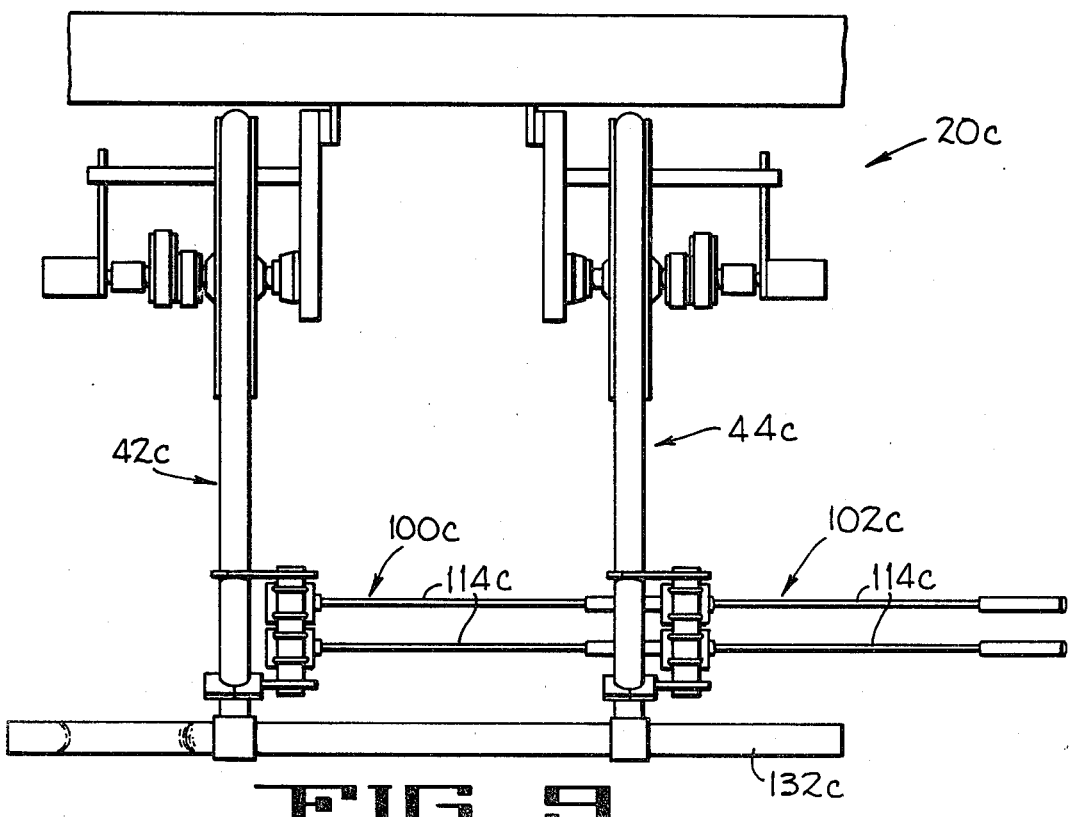
FIG_9

HARVESTER WITH SELECTIVE FORCE BALANCED SHAKING MECHANISM

CROSS REFERENCE TO RELATED APPLICATIONS

The present application relates to Franklin P. Orlando's application Ser. No. 178,327 which was filed on Aug. 15, 1980; and Franklin P. Orlando et al patent which issued on Sept. 1, 1981 as U.S. Pat. No. 4,286,426. Both of these cases are assigned to the assignee of the present invention, and the subject matter of both cases is incorporated by reference herein.

BACKGROUND OF THE INVENTION

1. Field of the Invention

The present invention relates to methods and apparatus for shaking and harvesting fruit such as grapes or the like from rows of plants.

2. Description of the Prior Art

Assignee's tests with the harvesters described in the above referred to applications indicate that different varieties of grapes have different vine shaking characteristics for maximum removal of grapes with minimum damage to the grapes and vines.

In an attempt to provide a harvester that will economically harvest different types of grapes, certain prior art harvesters are provided with two totally different shaking heads such as a pair of vine shaking heads or a pair of trunk shaking heads with or without several vine strikers attached thereto. The present attempts to solve the above mentioned problem require that heavy and expensive heads be changed to harvest grapes from plant varieties having different dislodgment characteristics. In order to change the prior art heads, the harvesters must be transported to maintenance facilities, and in many cases require change-over times of about one day. Also, the phase, frequency, and acceleration relationships between the different elements of the prior art shaking heads cannot be easily changed during operation.

U.S. Tennes et al U.S. Pat. No. 4,208,861 which issued on June 24, 1980 discloses a trunk shaker which uses heavy free-swinging pendulums which absorb the reaction energy generated by reciprocating crank means when shaking the trunk, whereas the subject shaker relies on forcebalanced shakers for shaking fruit from vines.

U.S. Horn et al U.S. Pat. No. 4,250,700 which issued on Feb. 17, 1981 discloses a combination trunk and foilage shaker which requires a heavy mass to absorb reaction forces when reciprocating the trunk shakers.

SUMMARY OF THE INVENTION

In accordance with the present invention a force balanced shaker is provided to overcome the shortcomings of the prior art devices, and to provide selected ones of several shaker combinations which may be quickly modified in the field for best removal of grapes from the many varieties of vines to be harvester. Since front and rear shaking heads are provided on the harvester of the present invention, and since certain of these heads may be operated independently of each other, the selected shaker combinations may be operated at the most effective frequencies, displacements, and speeds to provide the most effective removal of the particular variety of grapes being harvested.

BRIEF DESCRIPTION OF DRAWINGS

FIG. 1 is a diagrammatic front elevation of the grape harvester of the present invention with the shaking heads being illustrated in their foliage shaking mode and with the front and rear shaking units being driven by a single power source.

FIG. 2 is a vertical section taken along lines 2—2 of FIG. 1.

FIG. 3 is a horizontal section through the shaker heads of FIG. 1 but taken along lines 3—3 of FIG. 2.

FIG. 4 is a diagrammatic front elevation of a second embodiment of the shaking heads but illustrating a modified form of foliage strikers plus trunk shaking skiis movably connected to the shaking heads.

FIG. 5 is a side elevation of the shaking heads of FIG. 4.

FIG. 6 is a diagrammatic side elevation of a third embodiment of the shaking heads of the present invention illustrating the front shaker units and the rear shaker units being independently driven, and illustrating foliage strikers with the trunk shaking skiis being removed.

FIG. 7 is a section taken through the shaker heads along lines 7—7 of FIG. 6 with arrows illustrating different displacements between the front and rear heads.

FIG. 8 is a diagrammatic front elevation of a fourth embodiment of the invention with the dual drive of FIG. 6 but with modified foliage strikers and the trunk skiis attached thereto.

FIG. 9 is a side elevation of FIG. 8.

FIG. 10 is a side elevation of the foliage engaging end portion of a modified form of foliage shaking tine.

DESCRIPTION OF THE PREFERRED EMBODIMENT

The selective force balance shaker mechanism 20 (FIG. 1) of the present invention is mounted on a self propelled row crop harvester such as a grape harvester 22. The basic components of the harvester 22 are the same as that disclosed in the aforementioned Orlando application Ser. No. 178,327 now U.S. Pat. No. 4,336,682 which is incorporated by reference herein. Accordingly, only the major components of the harvester will be described.

The grape harvester 22 in general comprises a mobile self-propelled vehicle 24 having an inverted generally U-shaped chassis 26 which straddles and is driven down rows 28 of grape vines GV to be harvested. As indicated in FIGS. 1 and 2, the rows 28 of grape vines are trained on trellis wires 30,32 with the wires supported on posts 34. On some varieties the lower wires 30 support cordons 36 of the vines on which the bunches of grapes grow, while the upper wire 32 supports the non-fruit bearing canes. On other varieties, the grapes are supported by both wires as illustrated in FIG. 2. The harvester 22 supports the shaker mechanism 20 which shakes the fruit from the vines onto collecting conveyors 38 which transport the grapes to collecting means (not shown).

The shaking mechanism 20 comprises a front force balanced shaking unit 42 and a rear force balanced shaking unit 44. Each shaking unit 42,44 has shaker heads 46 and 48, respectively, which heads are supported on the chassis 26 on opposite sides of the row for pivotal movement about an axis A that extends longitudinally of the harvester 22. The front heads 46 are substantially mirror images of each other; and similarly, the rear heads 48 are substantially mirror images of each other. Accordingly, only the right shaking heads 46,48 will be described in detail and the same numbers will be used to identify equivalent parts of the left heads when needed.

The shaking heads 46 of the front shaker unit 42 each comprises a frame 50 of generally pork chop configuration lying in a plane transverse to the axis A. Each frame 50 is independently journaled on a front drive shaft 52. The front drive shaft 52 is journaled in bearings 54 secured to square cross bars 56 of the chassis 26 by clamps 58 and brackets 60.

Similarly, the shaking heads 48 of the rear shaking unit 44 each comprises a pork chop shaped frame 62 independently journaled on a rear drive shaft 64 that is coupled to the drive shaft of a motor, preferably a hydraulic motor 66. The shaft 64 is journaled in a bearing secured to another chassis cross bar 67 of square cross section by a sub-frame 68 which also supports the housing 70 of the hydraulic motor.

A tubular shaft 72 of proper length is secured in driving engagement to the shafts 52 and 64 by couplings 74. Thus, the single hydraulic motor 66 will rotate both shafts 52 and 64 at the same speeds, which speeds may be varied by the operator of the harvester as desired through conventional hydraulic circuits and controls.

As best shown in FIG. 1, each frame 50 of the front shaking heads 46 has a shaft 75 journaled therein and each shaft 75 is connected to the front drive shaft 52 by timing belt 76. Identical eccentric weight assemblies 77 are keyed to the associated shafts 75 but are maintained 180° out of phase with each other during rotation as illustrated in FIG. 1. Each eccentric weight assembly 77 is provided with a plurality of apertures 78 each of which may receive a removable weight or plug 79 to alter the weight of each assembly 77 the same amount in order to vary the amplitude of shake as desired. The plugs 79 may be inserted into or removed from the eccentric weight assemblies by first removing access plates 80 bolted to the associated frame 50.

A hydraulic cylinder 81 is pivotally connected between the two front frames 50 near the upper end thereof and is extended or retracted by the operator who actuates controls connected to the cylinder 81 by a conventional hydraulic circuit (not shown). During operation, the operator controls the cylinder 81 to normally maintain the upper ends of the frames spaced a predetermined distance apart somewhat as illustrated in FIG. 1 but may retract the cylinder 81 to spread the lower ends of the frames to avoid obstructions. During the shaking operation of the cylinder 81 normally holds the two front frames 50 from pivotal movement relative to each other so that the two front frames will oscillate together about axis A to define said front shaking unit 42.

The frames 62 of the rear shaking heads 48 each includes an eccentric weight assembly similar to the front assemblies 77 driven by timing belts 86, and maintained spaced a selected distance apart by a hydraulic cylinder 88 in a manner similar to that described above in regard to the front frames 50. However, it is desirable that the amplitude of the front shaking heads be less than that of the rear heads 48 in order to gently shake easily removed grapes from the vines thus minimizing damage to the grapes. Thus, the front eccentric weight assemblies will have fewer, or no, weight increasing plugs 79 therein, as compared to the weight plugs added to each rear eccentric weight assembly. In the preferred embodiment of the invention illustrated in FIGS. 1 and 2, it is desired to retain the front and rear shakers in phase with each other. Thus, the rear eccentric weight assemblies 84 will remain angularly aligned with the corresponding front eccentric weight assembly 72 during operation.

The components of the harvester 20 described above are substantially the same as those described in the above referred to Orlando application Ser. No. 178,327. When grapes to be harvested such as varieties having removal characteristics similar to Thompson seedless, it has been determined that foliage shakers, as opposed to trunk shakers, are most effective to remove the grapes from the vines.

As shown in FIGS. 1–3, a foliage shaker assembly 100 is secured to each shaker frame 50 of each front shaker head 46; and a foliage shaker assembly 102 is secured to each shaker frame 62 of each rear shaker head 48. Since the four foliage shaker assemblies are substantially the same but with the right and left assemblies being mirror images of each other, only the front right foliage shaker assembly 100 will be described in detail.

The assembly 100 comprises a beater support tube 104 having an upper bracket 106 and a lower bracket 108 attached thereto with the lower bracket being formed from two pieces welded together at an angle relative to each other for engagement of a curved portion of the associated shaker frame 50. The two brackets may be clamped to the associated shaker frame 50 by caps 110 and 112 (FIG. 2) and cap screws, or the brackets may be welded to the frame 50 if desired.

A plurality of flexible foliage beater rods or tines 114, which are preferably constructed of fiberglass, are included in each foliage shaker assembly 100. Each tine 114 preferably includes a metal wear resistant arcuate tip portion 116 and a tubular base portion 118 bonded thereto. The base portion 118 of each tube is inserted through holes in a box shaped clamp 120 and is welded in place. Parallel side walls of clamp 120 have arcuate cutouts therein which engage and are clamped to the associated beater support tube 104 by a pair of U-bolts 122 as best shown in FIG. 3.

In order to reduce the weight of the foliage shaker 100, the above mentioned brackets and tubes are preferably constructed from aluminum.

In operation of the grape harvester 20 as a foliage shaker harvester, the operator first drives the harvester into the vineyard and actuates the hydraulic cylinders 81,88 by means of a control lever 123 (FIG. 1) as required to spread the front and rear shaker heads 46,48 a sufficient amount to clear the end posts of the vine supporting trellis, which end posts are larger than the posts 34. The operator then actuates the cylinders 81,88 to move the low ends of the heads to their desired minimum spacing for harvesting.

The operator then actuates a hydraulic control lever 124 to drive the hydraulic motor 66 at a speed range of about 350–400 rpm. The specific speed range can, of course, be varied to provide the most effective removal of grapes with minimum damage thereto by actuating the control lever 124. Rotation of the front and rear eccentric weights 77 at the same speed will cause the tines 114 of the front and rear foliage shaker assemblies 100 to repeatedly strike the foliage thereby dislodging the grapes from the vines. The fiberglass tines 114 resiliently whip the foliage at a location which is preferably above the lower trellis wire 30 thereby minimizing damage to the grapes. The dislodged grapes fall onto the conveyors 38 and are transported to collecting means (not shown). As shown in FIG. 3, the inlet end of each pair of foliage shaker assemblies 100 are spaced farther apart than the tips of the tines. Thus, the converging tines 14 progressively increase the shaking force applied by the tines on opposite sides of the vines from the wide inlet end of the shaker assemblies to the tips of the tines.

After the easily removed grapes have been dislodged by the front shaker unit 42, the remaining grapes are dislodged by the tines of the rear shaker unit 44 which again strikes the grape vines. In order to provide a more severe shaking action with the rear shaker heads 48, one or more of the aforementioned additional weights or plugs 79 (FIG. 1) are added to both of the rear eccentrics thereby increasing the amplitude of the shaking action.

A second embodiment of the shaker mechanism of the present invention is diagrammatically illustrated in FIGS. 4 and 5 as a combined foliage and trunk shaker 20a. Most red grape varieties are difficult to remove from the vine and accordingly the combined foliage and trunk shaker 20a is ideally suited for this type of grapes. Since many of the components of the second embodiment of the invention are the same as those described in regard to the first embodiment, equivalent parts will be identified by the same numerals used in the first embodiment followed by the letter "a" and only the differences will be described in detail.

The front and rear shaking heads 46a, 48a have trunk shaking skiis 130,132 secured to the lower ends of their frames 50a, 62a by removable connectors 133 which permit a limited amount of movement between the skiis 130,132 and the associated frames 50a, 62a. The combined foliage and trunk shaker 20a has a foliage shaking assembly 100a, 102a secured to each frame 50a, 62a, respectively. The foliage shakers 20a differ from the foliage shaker of the first embodiment of the invention in that fewer foliage beater tines 114a are used, two such tines on each head being illustrated in FIGS. 4 and 5.

The operation of the harvester when fitted with the foliage and trunk shaker 20a is substantially the same as that described in the first embodiment of the invention except that both the trunk and foliage are contacted and shook during harvesting.

A third embodiment of the shaker mechanism of the present invention is diagrammatically illustrated in FIGS. 6 and 7 as a foliage shaker 20b that is similar to the first embodiment of the invention except that: the rear shaking heads 48 are driven by the hydraulic motor 66b, the tubular shaft 72 (FIG. 2) of the first embodiment of the invention is removed, and the front shaft 52b (FIG. 6) of the front shaking heads 46b is coupled to a second hydraulic motor 140. The hydraulic motor 140 includes a housing 142 which is secured to the harvester chassis 26b by the bracket 60b and a motor supporting bracket 144 secured thereto. A hydraulic control lever 146 (FIG. 1) is actuated by the operator to drive the front motor 140 (FIG. 6) at the desired speed when the grapes require a hard shake to remove the grapes from the vines, the operator may vary the speeds of the two motors 66b, 140 by rapidly moving two control levers 124 and 146 (FIG. 1) to different positions while shaking thus eliminating stationary areas or nulls in the vines during shaking.

The arrows in FIG. 7 indicates that the displacement of the front foliage shaker assembly 100b is less than that of the rear assembly 102b for providing a relatively gentle initial shaking action and a stronger final shaking action. In order to provide a more severe vine shaking action with the rear shaker assembly, the eccentric weight assemblies in the rear shaker are heavier than in the front shaker and/or the speed of the rear assembly 102b may be greater than that of front assembly 100b.

A fourth embodiment of the shaker mechanism 20c of the present invention is diagrammatically illustrated in FIGS. 8 and 9 and is the same as the third embodiment of the shaker 20b except that skis 130c,132c have been added thereto and a reduced number of foliage contacting tines 114c in the associated foliage shaking assemblies 100c,102c are provided. Although only two tines 114c are shown in each foliage assembly 100c,102c it will be understood that more tines may be used if necessary.

The independent actuation of control levers 124, 146 (FIG. 1) serve to independently drive the front and rear shaker units 42c, 44c of the foliage and trunk shaker mechanism 20c. Independently controlling the two shaking units 42c, 44c is required for the most severe shaking of the grape vines since the trunks as well as the foliage are contacted at different frequencies, different amplitudes, and different phase relationships.

A second embodiment of a foliage engaging tine 150 is illustrated in FIG. 10 and may be substituted for the tines 114,114a,114b or 114c used in the previously described embodiments of the invention.

Each tine 150 includes a straight rod 152 of resilient material such as fiberglass, and is clamped to the associated shaking head by structure similar to that disclosed in the previously described embodiments of the invention. The free end of the rod is preferably tapered to minimize injury to the foliage, and a set collar 154 is secured to the rod in desired position by a set screw 156. The set collar 154 may be adjusted along the length of the rod and locked in the position which provides the most desirable shaking amplitude for removing grapes from the vines.

From the foregoing description it is apparent that the harvester with force balancing shaker mechanism of the present invention may be easily altered to shake grapes (or other fruits or nuts) of many different varieties from their vines by selecting suitable combinations of front and rear foliage shakers and/or trunk shakers that are best suited for the particular variety being harvested. The selected front and rear shaking mechanisms are preferably driven by a single hydraulic motor thereby providing an economical and easily operated shaking mechanism. However, if the grower has grape varieties which are known to be difficult to shake from the vines, the shaking mechanism may be easily and quickly modified to drive the front shaking heads with one motor and the rear shaking heads with a second motor. The operator is then provided with independent motor controls thereby providing a wide variety of shaking frequencies, shaking amplitudes, and phase relationships between the front and rear shaking units enabling the operator to select the best shaking parameters for the particular grape varieties being harvested.

Although the best mode contemplated for carrying out the present invention has been herein shown and described, it will be apparent that modification and variation may be made without departing from what is regarded to be the subject matter of the invention.

What is claimed is:

1. A harvester for shaking crops such as grapes from plants grown in a row comprising a vehicle movable along said row, means defining a front force balanced shaking unit with a shaking head on each side of the row, means defined a rear force balanced shaking unit with a shaking head on each side of the row, means for pivotally supporting said front and rear heads on said vehicle for pivotal movement only about a common axis extending longitudinally of the row during harvesting, and selectively operable power means on the vehicle connected to said front unit and said rear unit for oscillating said heads transversely of the row only about said common axis; the improvement which comprises a foliage shaker assembly rigidly secured to each of said heads each foliage shaker assembly including a plurality of substantially horizontal flexible resilient tines each having a mounting end fixed to the associated head and a free end projecting rearwardly and inwardly toward the adjacent sides of said plants and movable relative to said associated heads only in response to resilient deflection of said tines, said tines being responsive to forward movement of the vehicle and to oscillation of the heads only about said common axis by said power means for striking the vines thereby removing the crop therefrom.

2. An apparatus according to claim 1 wherein a single selectively operable power means is connected to said front and rear heads, and operator controlled means for simultaneously varying the rate of oscillation of said front and rear heads.

3. An apparatus according to claim 1 wherein said selectively operable power means comprises first and second independently operable power means, said first power means connected to said front heads for oscillating said front heads at selected frequencies, and said second power means connected to said rear heads for oscillating said rear heads independently of said front heads at frequencies which are the same as or different from that of said front heads for providing the most effective removal of the crop from the plants.

4. An apparatus according to claim 1 and additionally comprising a pair of trunk engaging skiis, and means for removably connecting one ski to the front and rear heads on one side of the row and movably connecting the other ski to the front and rear heads on the other side of the row.

5. An apparatus according to claim 4 wherein said selectively operable power means comprises first and second independently operable power means, said first power means being connected to said front heads for oscillating said front heads at selected frequencies, and said second power means connected to said rear heads for oscillating said rear heads independently of the front heads at frequencies the same as or different than that of said front heads for providing most effective removal of the crops from the plants.

6. A method of harvesting a plurality of varieties of crops from rows of plants with a harvester having a front force balanced shaking unit and a rear force balanced shaking unit pivoted on the harvester for oscillation only about a common axis with each unit including a shaking head on each side of the row, said method including the steps of:
  selectively connecting a foliage shaker including a plurality of resilient tines and/or a trunk shaker to each of the front and rear heads;
  when harvesting crop varieties which are easily removed from their plants, mounting only foliage shakers rigidly to each head and oscillating said front and rear shaking units only about said common axis for striking the foliage of the plants as the harvester is driven along said row of plants;
  when harvesting crop varieties which are difficult to remove from the plants, mounting one end of a foliage shaker rigidly to each head and a trunk shaker on each pair of front and rear shaker heads on each side of said row, and oscillating said front and rear shaking units about said common axis at selective rates which will most effectively remove the crop from the plants as the harvestor is driven along said row of plants.

7. A method according to claim 6 and additionally including the steps of oscillating said front and rear shaking units at different speeds relative to each other only about said common axis when said easily removed crops require changes in frequency and phase relationship to more effectively remove the crop from the plants.

8. A method according to claim 6 and additionally including the step of oscillating said front and rear shaking units at different speeds relative to each other only about said common axis when said difficult to remove crops require changes in frequency and phase relationship to most effectively remove the crop from the plants.

9. A method according to claim 6 wherein said easily removed crop varieties are grape varieties having the dislodgment characteristics of Thompson seedless grapes.

10. A method according to claim 6 wherein said difficult to remove crop varieties are red grape varieties.

* * * * *